United States Patent

[11] 3,626,101

[72] Inventors Alan R. Fitzsimons
Laguna Beach;
Robert John Phelps, Anaheim, both of Calif.

[21] Appl. No. 829,583
[22] Filed June 2, 1969
[45] Patented Dec. 7, 1971
[73] Assignee San/Bar Electronics Corporation
Long Beach, Calif.

[54] LOOP EXTENDER FOR SUBSCRIBERS CONNECTED TO A CENTRAL OFFICE BY ABNORMALLY LONG TELEPHONE LINES
10 Claims, 2 Drawing Figs.

[52] U.S. Cl. .......... 179/16 F
[51] Int. Cl. .......... H049 1/30
[50] Field of Search .......... 179/16 F, 16 E, 16 EB, 84

[56] References Cited

UNITED STATES PATENTS

| | | | |
|---|---|---|---|
| 3,393,274 | 7/1968 | Ingraham .......... | 179/16 |
| 3,508,009 | 4/1970 | Henry et al. .......... | 179/16 |
| 2,938,955 | 5/1960 | Molnar .......... | 179/16 E |
| 3,168,622 | 2/1965 | Smee .......... | 179/16 E |
| 3,187,105 | 6/1965 | Parry .......... | 179/16 E |

*Primary Examiner*—Kathleen H. Claffy
*Assistant Examiner*—Randall P. Myers
*Attorney*—Jackson & Jones ABSTRACT: A loop extender for use with telephone lines exhibiting line resistance in excess of normal telephone lines is disclosed. The loop extender is located at the central office and operates in conjunction with central office equipment that is designed to obtain information such as dial pulses from a subscriber. One portion of the central office equipment exhibits a saturated condition in response to a predetermined shunt across the telephone pair. Means are provided in the loop extender for recognizing dial pulses over the telephone lines from the subscriber and responding thereto by alternately open circuiting and shunting the telephone pair whereby the central office equipment obtains the information transmitted form the subscriber.

PATENTED DEC 7 1971

3,626,101

INVENTORS
ALAN R. FITZSIMONS
ROBERT JOHN PHELPS
BY Jackson + Jones
ATTORNEYS.

LOOP EXTENDER FOR SUBSCRIBERS CONNECTED TO A CENTRAL OFFICE BY ABNORMALLY LONG TELEPHONE LINES

BACKGROUND OF THE INVENTION

1. Field of the Invention

The field of this invention generally includes circuitry for adapting unusually long subscriber lines to a central office that is not suitable under normal conditions to handle such far removed subscribers. In particular, the field of this invention includes a loop extender circuit connected between a subscriber and a central office in such a manner that a subscriber far removed from the central office appears closer thereto.

2. Description of the Prior Art

Telephone systems which include circuits adaptive to connect subscribers at unusually long distances from a central office and yet make them appear closer to the central office, are well known. In such telephone systems the central office equipment accomplishes numerous functions. The basic central office function which is of interest here is the function of connecting a calling station to a called station.

Consider first a subscriber placing a call. When such a subscriber removes his handset off of the telephone instrument, it is necessary that the central office recognize the request for service and supply dial tone to the subscriber. At the central office, equipment is thereafter made available to receive dialing pulses sent by the calling party. The dial pulses are in the form of current signals transmitted from the subscriber over a conventional line conductor pair.

Consider next a called party. Once the central office has received and translated the dial pulses, a ringing voltage is applied by the central office to the appropriate called party. When the called party removes his handset, the central office must remove the ringing voltage from the called party's instrument.

The distances of the subscribers connected to a central office primarily control the amount of line resistance therebetween. Experience has shown that a plurality of central offices can adequately serve a great number of subscribers provided that the subscriber's distance does not present more than approximately 1,200 ohms of line resistance to the central office equipment. In many instances, however, it is desirable to connect subscribers at unusually long distances to a central office fitted with standard telephone equipment. In such instances long-line adapter circuits are mandatory. These adapter circuits typically repeat signals sent from the central office to the subscriber, or vice versa, so that both the central office and the subscriber operations are compatible even though the line resistance is far in excess of the desired 1,200 ohms.

Numerous conventional adapter circuits are known to the prior art. One conventional approach is to operate certain central office equipment in a dual voltage mode. In such an operation long lines with their attendant high resistance are recognized and provided with a high operating voltage. Standard impedance lines are provided with a conventional low voltage. By assigning a higher voltage to the long lines the range for which signals may be suitably transmitted is extended. The provision of two separate operating voltages is a distinct disadvantage. It creates considerable complexity in circuit design and in operating parameters. Furthermore, the required central office equipment is more complex in that long lines must be recognized and logic circuitry made available to select proper voltage for the line in question.

Another prior art approach utilizes transformer coupled pulse repeaters in the telephone pair. Such repeaters must be capable of two-way transmission of audio signals and of repeating supervisory and pulsing signals transmitted from the central office to the subscriber, or vice versa. This two-way operation with transformer coupling necessitates pulse and supervisory signal repetition from one side of the line to the other. In addition, transformers introduce transmission insertion loss of up to 1 db. into the speech path between the central office and the subscriber. Furthermore, in many cases the use of a transformer limits the line operation to that of a single party because of the difficulty in reapplying the different ringing frequencies.

Another type of prior art long-line adapter utilizes line connected transistors. One approach is to connect one transistor in a tip lead and another transistor in the ring lead of a standard telephone conductor pair. Another approach is to connect a transistor across the line pair. Line connected transistors, however, tend to introduce line imbalance and consequent noise. They also result in significant bridging losses. Furthermore, lightning striking the telephone lines may introduce high voltage transients capable of destroying the transistors, thus rendering the telephone line inoperative.

SUMMARY OF THE INVENTION

Our invention comprises a loop extender circuit which is connected between a telephone central office and a subscriber. It is particularly applicable to a subscriber located at an unusually long distance from the central office. Our loop extender circuit may conveniently be located at the central office and includes means responsive to signals which are transmitted by a subscriber over a conductor pair of length in excess of conventional length. The attenuated signal responding means causes the severely attenuated signals to be repeated at conventional signal levels appropriate for the conventional central office equipment.

Associated with the signal-responsive means is an impulsing circuit arrangement which repeats the signals received from the subscriber and applies them to the central office in such a manner that a conventional relay in the central office is saturated. During the signal repeating operation of my invention, the conductor pair is alternately open circuited and shunted proximate the central office in order to establish repeated dial pulses as defined by the remote subscriber. The saturated condition of the central office relay established by the shunted line condition enables the central office relay to hold over the subscriber line between dial pulses even though the line resistance to that subscriber is considerably in excess of normal line resistance.

Since our invention is also present on the line when a subscriber is being called, it includes means to isolate the signal sensing means from ringing voltage applied by the central office. When the called party removes his hand set, direct current is established on the line and means are provided in our extender circuit to signal the removal of any further application of ringing voltage to the subscriber.

Since our loop extender requires no line transformers, the transmission insertion loss is negligible. Further, multiparty operation is feasible since my loop extender will pass any desired ringing frequency without distortion.

Further, since the loop extender of our invention does not require line connected transistors, the line imbalance and bridging loss effects associated with such devices are obviated. In addition, since the loop extender of our invention provides the repeated dial pulses to the central office equipment in accordance with an accurately controllable sequence variation in the make-break ratio of the telephone instrument, dial will not affect the extender output pulse sequence.

Figure 1:
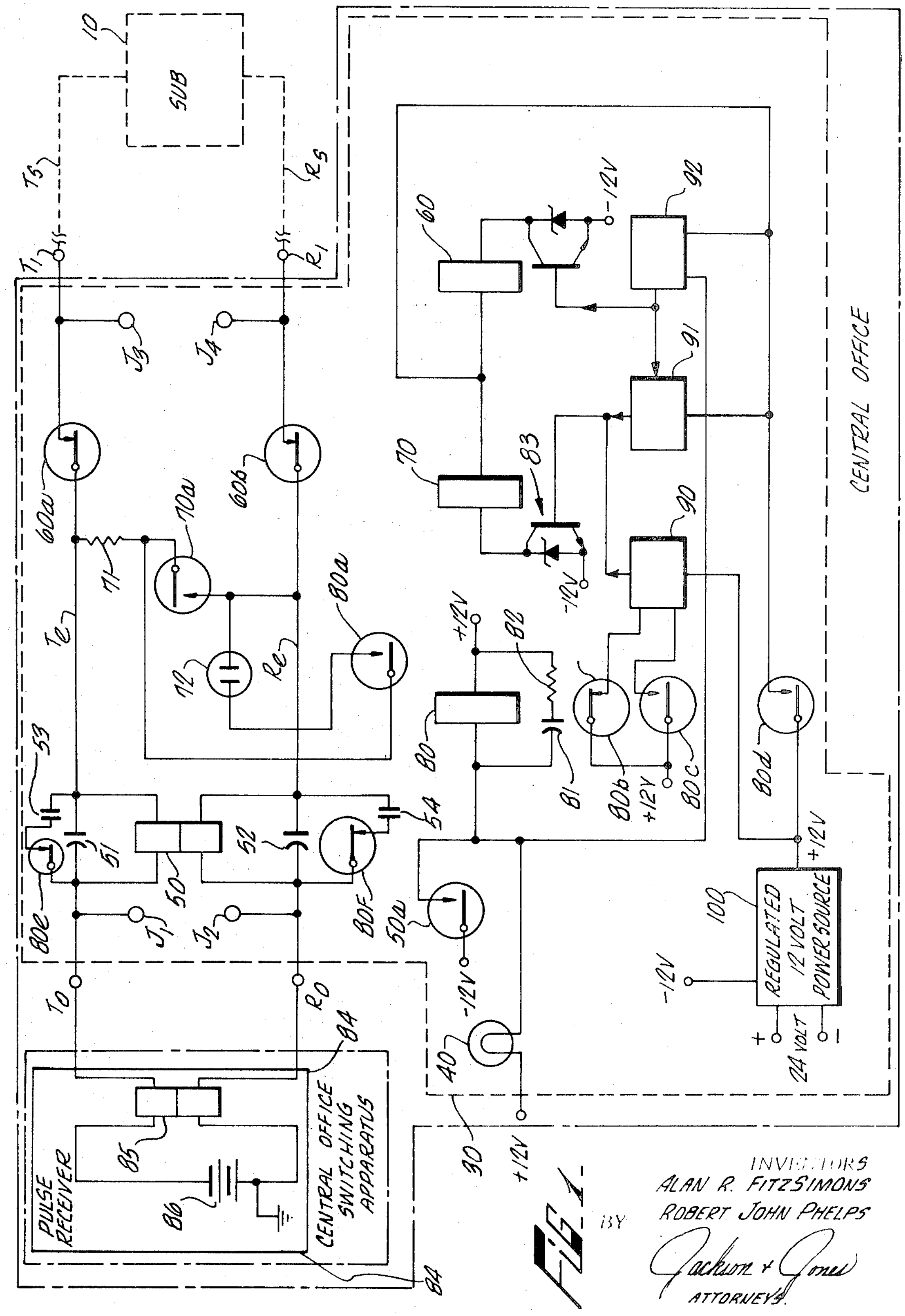
FIG. 1 is a block diagram and circuit schematic of one embodiment of a loop extender constructed in accordance with the principles of my invention.

DESCRIPTION OF THE PREFERRED EMBODIMENT:

Referring now to FIG. 1, a subscriber substation 10 is shown connected to a central office pulse receiver 84 including a pulse receiving "A" relay 85 via a standard telephone line conductor pair $T_s$,$R_s$ and loop extender 30. Telephone line conductors $T_s$,$R_s$ may, in accordance with this invention be of extremely long length.

Loop extender 30, which is preferably mounted in the central office, has a line conductor pair $T_e$,$R_e$ which is adapted to be connected to telephone lines $T_s$,$R_s$ via terminals $T_1$,$R_1$ and to the central office pulse receiving relay via terminals $T_o$,$R_o$.

A bifilar wound dry reed sensing relay 50 is in line connected to the loop extender lines $T_e$,$R_e$ to sense the conventional direct current flowing through the line conductor pair. Two pairs of bypass capacitors 51,53 and 52,54 shunt the coil windings of the sensing relay 50 as shown to prevent the sensing relay 50 from being operated by the high ringing voltages. The shunt capacitors serve to present a low impedance to the AC voltage of the ringing supply and audio signals. Shunt capacitors 53 and 54 are connected across the sensing relay windings via switch contacts **80*e* and 80*f* respectively. Upon opening contacts 80*e* and 80*f* serve to remove the shunt capacitors 53 and 54 from the circuit. The contacts 80*e* and 80*f*, illustrated in their normal positions, are opened whenever a relay 80** is energized.

A reed type relay switch 60 having contacts **60*a* and 60*b*, which contacts are in series relationship with lines $T_e$ and $R_e$, respectively is connected adjacent terminals $T_1$ and $R_1$ of loop extender 30, as shown. A contact 70*a* of a reed switch 70 is connected via resistance 71 across lines $T_e$ and $R_e$. The contact 70*a* serves as an impulsing contact. Resistance 71 connected in series with the contact 70*a* serves as a current limiter during the impulsing produced by momentary closure of the contact 70*a***.

Closure of contact **50*a*, by energization of the sensing relay 50, serves to activate a relay 80. Contacts 80*b* and 80*c* of relay 80 serve to control a variable one to three second integrated circuit timer 90 in a manner to be hereinafter described. A contact 80*a* of relay 80 serves to connect a neon lamp 72 across the switch contact 70*a* to provide transient suppression during impulsing. The contacts 80*e* and 80*f*, as above described, serve to remove shunt capacitors 53 and 54 from the circuit thus reducing the value of shunt capacitance to a value suitable for pulsing. Relay 80 is set slow to release due to the connection of a capacitor 81 and resistor 82** across the relay coil.

Relay contact **50*a* upon release (opening) triggers a 55-millisecond integrated pulsing circuit 92 the output of which operates a relay 60 and a 15-millisecond integrated pulsing circuit 91. Integrated circuit 91, in turn, serves to operate the relay 70** as will hereinafter be described.

A power supply 100, which may preferably be of the series regulator type, delivers approximately 12 volts of DC to the relays and integrated circuits as shown. A contact **80*d* of relay 80 ensures that power is only applied during pulsing and during the talking condition. A lamp 40 is connected to relay 80** to provide an indication of the busy condition. A plurality of test jacks $J_1$–$J_4$ are provided, as shown, to enable maintenance personnel to monitor either the central office side or the subscriber's side.

Figure 2:
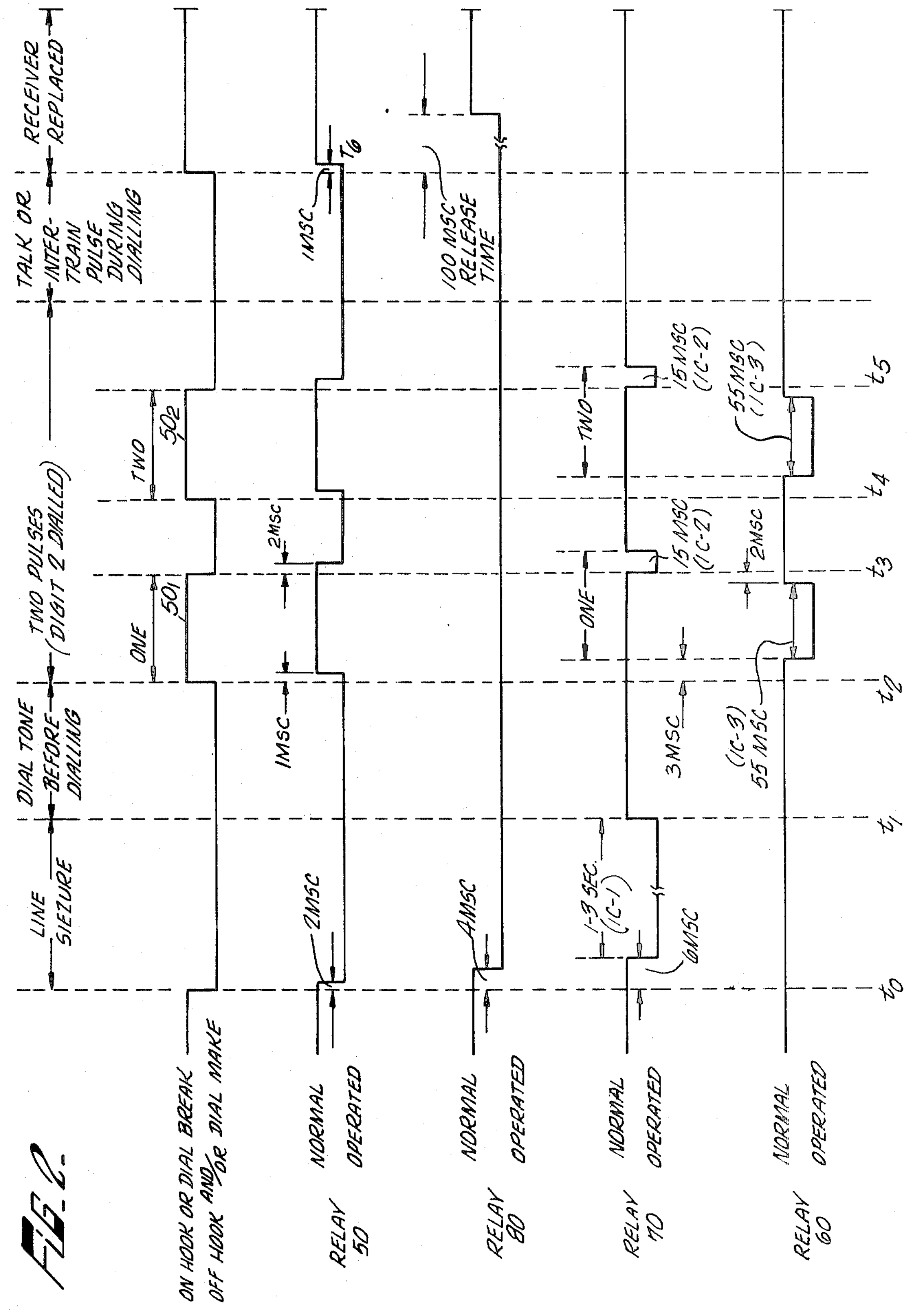
FIG. 2 is a functional waveform chart useful in promoting a clear understanding of the operation of the circuit of FIG. 1.

The operation of the loop extender 30 of FIG. 1 will now be described having additional reference to FIG. 2 wherein there is shown a functional waveform chart indicating the sequence of operation of the various relays and components. All pulses in FIG. 2 are shown by broken lines wherein the individual times are indicated where required. Two dialing pulses are depicted in FIG. 2. All others, of course, would be identical Assume that at time $t_o$ a calling subscriber at 10 goes off hook, thus completing the line loop at the remote subscriber station. Completing the loop circuit results in the flow of direct current therein. If the transmission line is very long thus exhibiting a high resistance, the current flow may be insufficient to seize the central office pulse receiving "A" relay 85. The sensitive dry reed sensing relay 50, however, responds to the subscriber's off-hook seizure at time $t_o$ and operates at approximately $t_o + 2$ msc. It should be noted that a dry reed type relay characteristically operates in about 2 msc. and releases in about 1 msc.

The contact **50*a* of relay 50 operates relay 80 and also serves to light the indicating busy lamp 40. The relay 80 is, as above noted, slow to release because of the presence of capacitor 81 and resistor 82 connected across its coil. The RC combination assures that holdover will occur during pulsing. Relay contact 80*c* on closure triggers an integrated circuit timer 90 which serves to activate the drive circuit 83 of relay 70** for a 1 to 3 second adjustable time period.

The contact **70*a* of relay 70 bridges the line at a point adjacent to the central office equipment thus providing the central office "A" relay 85 with a positive "line seizure" condition irrespective of the length of the subscriber line. The central office A relay when energized is adapted to operate additional equipment in the central office 30** in a manner well known in the telephone art. The adjustable time period is incorporated to cater to those offices where receipt of dial tone may be delayed after receiver removal. This time delay does not repeat unless another on-hook, off-hook condition is sensed.

At the first dial impulse, $50_1$ which is initiated at time $t_2$, FIG. 2, (a dialed impulse corresponds to a break in the line), sensing relay 50 is caused to be released. Relay contact **50*a* on release (or opening) triggers integrated circuit 92. Integrated circuit 92 provides a drive signal to operate relay 60 for 55 msc. Contacts 60*a* and 60*b* of relay 60** serve as disconnect contacts to the subscriber's line.

The 55 msc. time is a break period wherein the subscriber line is totally disconnected from the central office equipment. The central office A relay 85 is therefore provided with an ideal release totally independent of the subscriber's line condition. Integrated circuit 92, after the 55 msc. interval, thereafter provides an operate signal to integrated circuit 91. Integrated circuit 91 serves to operate switch 70 for a 15 msc. interval. Contact **70*a* of switch 70** is the impulsing contact which, upon closure, provides a 15 msc. pulse to the central office "A" relay.

The 15 msc. period is the saturation period for the central office impulsing "A" relay 85, which will then hold over a very high resistance line, if required, until the next pulse. The foregoing sequence is repeated for each impulse dialed. Since the integrated circuits are capable of a high degree of accuracy, pulse correction is inherent to the operation without regard to the make-break ratio and speed of the originating dial within an 8–12 pulses per second range.

On an incoming call, the sensing relay 50 will not operate in response to the high ringing voltage because of the very low impedance presented by the shunt capacitors 51,53 and 52,54 connected across the two coil windings which, as previously described, appear as low pass filters. As is known, during ringing any DC path is effectively blocked by the telephone instrument network capacitor of the bell circuit. Receiver removal loops the line and shunts the blocking capacitor permitting direct current to flow. The direct current flow operates the sensing relay 50 and thereafter gives a line seizure condition to the central office equipment and thus effectively tripping the ringing.

Because the entire loop extender unit is capable of central office mounting, minimum resistance is presented to the ringing relays of the central office equipment. The ring-trip operation will be positive and will be unaffected by the presence or absence of the ringing voltage in the ringing or silent period of the ringing cycle. It will further be noted that the final release of the relay 80 is about 100 msc., FIG. 2. This is adequate to hold over on pulsing, but allows rapid release on receiver replacement. The relay 80 controls the seizure time of 1 to 3 seconds and only functions once per call.

The novel loop extender of our invention efficiently senses the condition of long telephone lines, including the presence of pulsing signals, and accurately repeats the pulse signals to the central office equipment. Since the only in-line connection is a low impedance relay coil, transmission insertion losses are negligible. Further, since no line transformers are required, multiparty operation and consequent increased efficiency is feasible.

What is claimed is:

1. A loop extender circuit for use in a telephone system including a remote subscriber and a central office connected by a telephone line pair of length in excess of standard telephone line lengths for which said central offices is adapted, said telephone line pair being selectively open circuited or shunted by said remote subscriber to establish pulse information signals for a pulse receiving means in said central office which pulse information signals may be attenuated by the excessive length of said telephone line pair, said loop extender circuit comprising:

a line conductor pair adapted to be connected between the central office and the remote subscriber at a location proximate the central office;

sensing means connected to the line conductor pair for detecting pulse information signals from a remote subscriber and formed by a shunting or open circuiting of said telephone line pair by said remote subscriber;

contact means connected in at least one line of the line conductor pair;

contact control means responsive to an open circuit condition detected by said sensing means for selectively operating the contact means and open circuiting the line conductor pair for a selected time period to provide said pulse information signals to the central office pulse receiving means, said selected time period being independent of the duration of the open circuiting of said telephone line pair by said remote subscriber; and shunting means, controlled by said contact control means, for shunting the line conductor pair subsequent to completion of the open circuiting of the line conductor pair by said contact means, said shunting being maintained for a selected time sufficient to allow the central office to hold the line until the next pulse information signal is received.

2. The apparatus defined by claim 1 comprising:

bypass means, connected across said sensing means, for selectively providing a low impedance path for alternating current signals applied to said telephone line pair whereby said sensing means is prevented from being activated by said alternating current signals.

3. The apparatus defined by claim 2 wherein said sensing means comprises a dry reed bifilar wound relay having a pair of relay coils each adapted to be connected to one of said lines forming said telephone line pair and adapted to be energized by direct current signals.

4. The apparatus defined by claim 3 wherein said bypass means comprises at least one capacitor connected across each of the coils of said sensing means, and means for disconnecting said bypass means in response to the first close circuiting of said telephone line pair by said remote subscriber.

5. The apparatus defined by claim 1 wherein said sensing means includes a relay having a pair of coils each connectable in one of said telephone lines of said telephone line pair, said relay being energized by direct current signals.

6. In a telephone system including a remote subscriber and a central office connected by a telephone line pair, said telephone line pair being selectively open circuited or shunted by said remote subscriber to establish pulse information signals which are responded to by a pulse receiving means in said central office, a loop extender comprising:

a line conductor pair adapted to be interposed between the central office and the remote subscriber by connection to said telephone line pair proximate the central office;

sensing means connected to the line conductor pair for sensing said shunt or open circuit condition of said telephone line pair;

contact means connected in at least one line of said line conductor pair;

contact control means responsive to an open circuit condition sensed by said sensing means for operating the contact means and open circuiting the line conductor pair for a first time interval sufficient to operate said pulse receiving means; and shunting means responsive to completion of said open circuiting by said contact control means for shunting said line conductor pair for a second time interval subsequent to said first time interval to allow said pulse receiving means to hold the line pending receipt of the next pulse information signal.

7. The apparatus defined by claim 6 wherein said sensing means includes a relay having a pair of coils each connectable in one of said telephone lines of said telephone line pair, said relay being energized by direct current signals.

8. The apparatus defined by claim 6 further including bypass means connected in parallel with said sensing means for selectively providing a low impedance path for alternating current signals on said telephone line pair, said sensing means being prevented from activation by said alternating current signals.

9. The apparatus defined by claim 8 wherein said sensing means includes a relay having two coils each connected in parallel with said bypass means, each of said coils operatively connected in one of said telephone lines of said telephone line pair, said relay being energized by direct current signals.

10. The apparatus defined by claim 9 wherein said bypass means includes a capacitor connected across each of said two coils, and means disconnecting said bypass means in response to the first said shunting of said telephone line pair, by said subscriber, detected by said sensing means.

* * * * *